United States Patent

Kikuta et al.

[11] Patent Number: 5,086,900
[45] Date of Patent: Feb. 11, 1992

[54] POWER CONVERTING MECHANISM

[75] Inventors: Tomoyuki Kikuta; Chikara Kawaguchi, both of Kosai, Japan

[73] Assignee: ASMO Co., Ltd., Kosai, Japan

[21] Appl. No.: 533,756

[22] Filed: Jun. 6, 1990

Related U.S. Application Data

[63] Continuation-in-part of Ser. No. 176,148, Mar. 31, 1988, Pat. No. 4,903,535.

[51] Int. Cl.[5] .............. F16D 23/10; F16D 11/04; F16H 27/02; F16C 1/00
[52] U.S. Cl. ............... 192/142 R; 74/89.15; 74/424.8 R; 192/141; 192/143; 318/484; 464/57
[58] Field of Search ........... 74/89.15, 424.8 R; 192/141, 142 R, 143, 105 BB; 318/484; 464/57

[56] References Cited

U.S. PATENT DOCUMENTS

| | | | |
|---|---|---|---|
| 1,696,344 | 12/1928 | Clark | 74/89.15 |
| 2,346,728 | 4/1944 | Carlson | 74/89.15 |
| 2,634,370 | 4/1953 | Carlson | 74/424.8 R |
| 2,649,300 | 8/1953 | Launder | 74/424.8 R |
| 2,778,239 | 1/1957 | Hoover | 74/424.8 R |
| 3,258,985 | 7/1966 | Jordan | 74/424.8 R |
| 3,559,499 | 2/1971 | Profet | 74/424.8 R |
| 3,736,802 | 6/1973 | Kibler | 74/89.15 |
| 4,903,535 | 2/1990 | Kikuta et al. | 74/89.1 |

Primary Examiner—Allan D. Herrmann
Assistant Examiner—David W. Laub
Attorney, Agent, or Firm—Burns, Doane, Swecker & Mathis

[57] ABSTRACT

In the electric actuator of the present invention, the power converting mechanism is provided for converting the rotary power of the motor into linear power of the driven member, which needs no special component part. Therefore, in comparison with the prior art power converting mechanism, it is advantage in that the scale of speed reduction and the stroke can be freely determined, with remarkably reduced number of parts and in low cost. The electric actuator according to the present invention is also provided with the improved clutch device employing the engagement of the weight and the recessed portion for secure transmission of the rotary power of the motor, resulting in full utilization of the capacity of the motor in simplified structure.

5 Claims, 12 Drawing Sheets

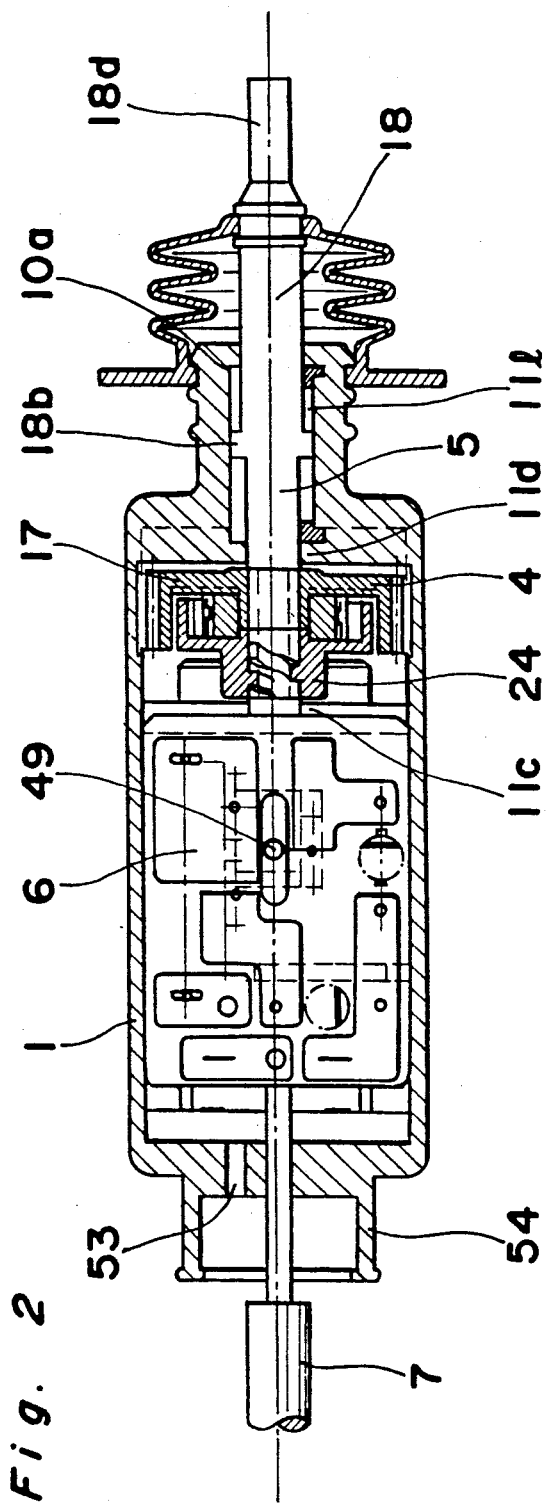
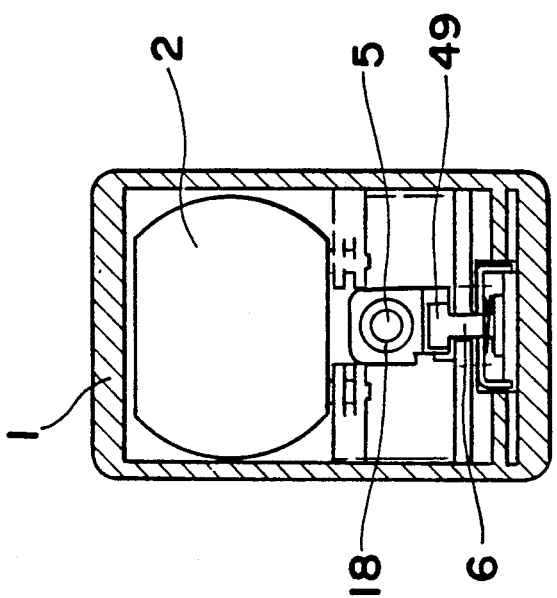
Fig. 2
Fig. 3

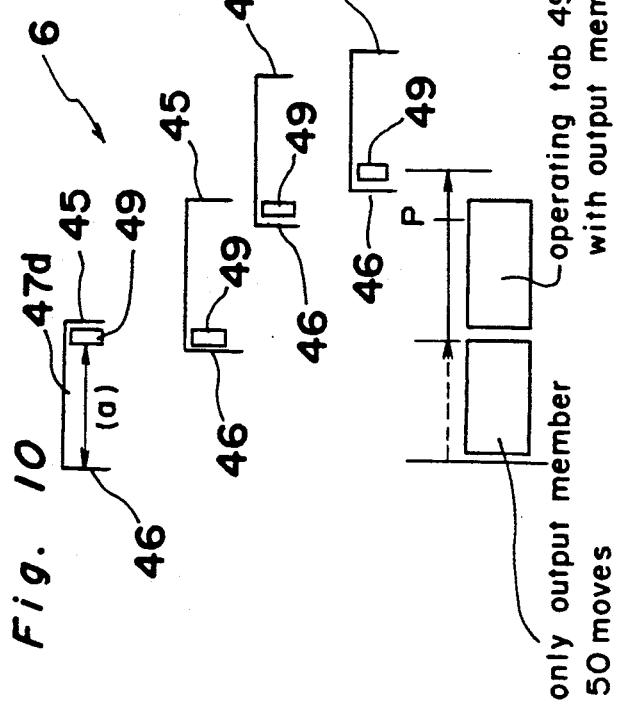

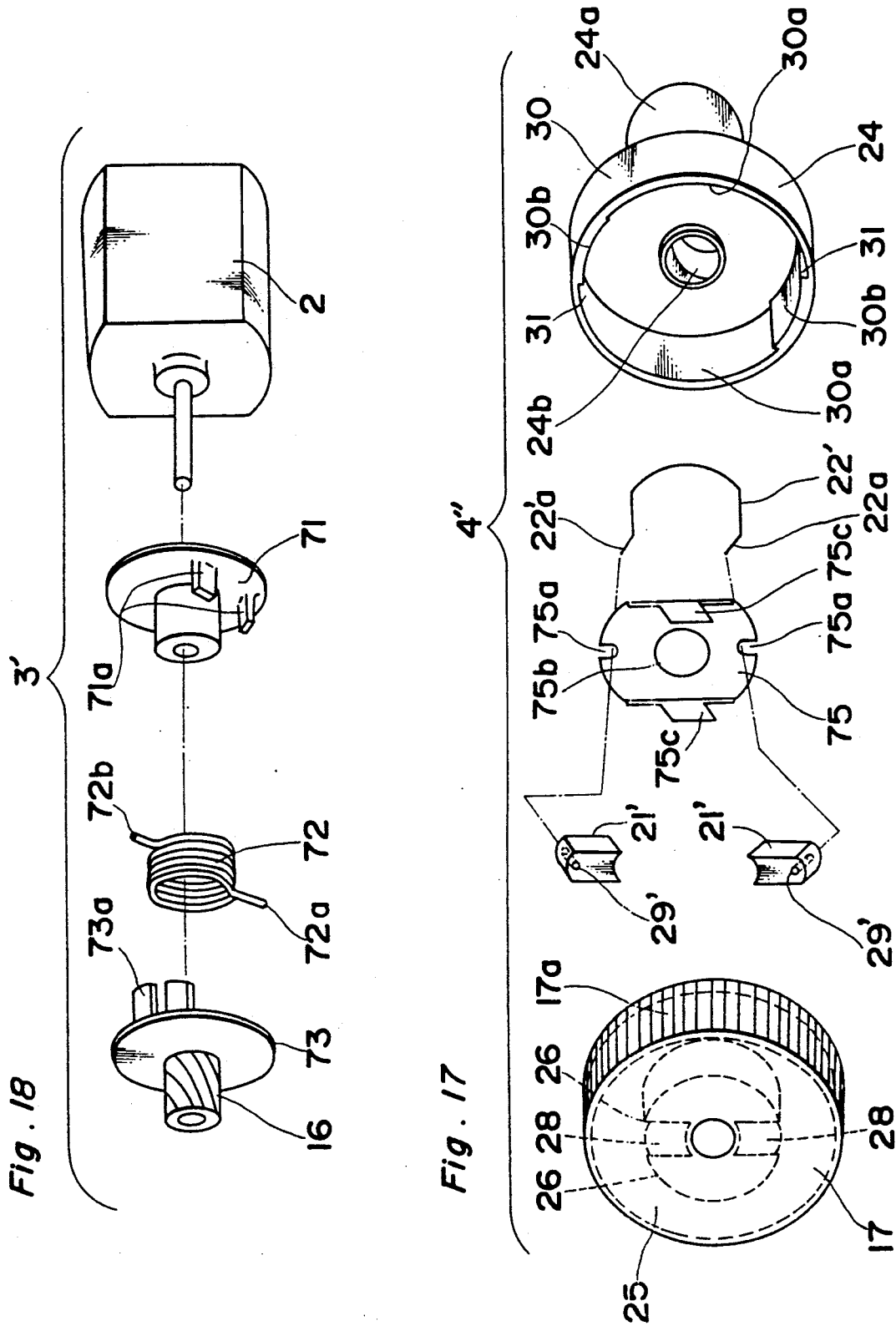

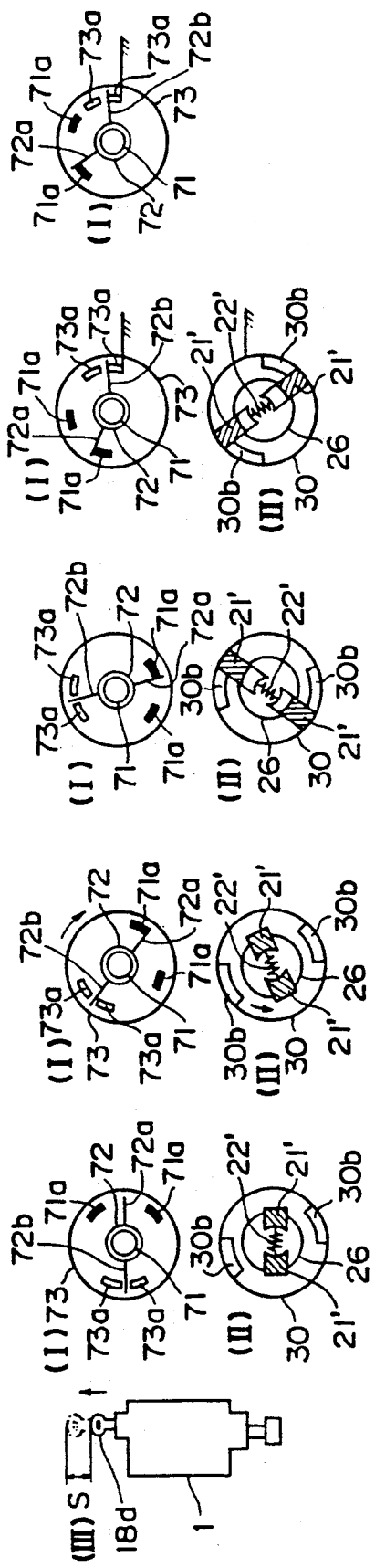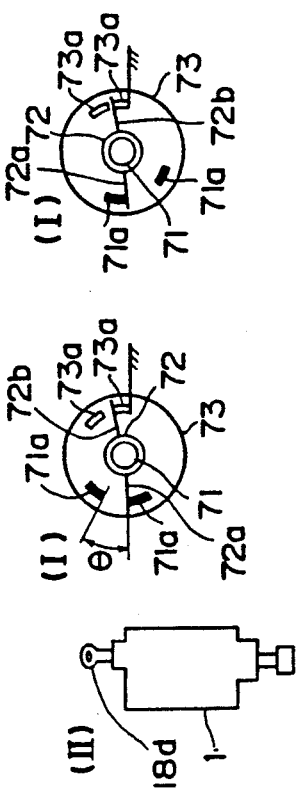

POWER CONVERTING MECHANISM

This application is a continuation-in-part application with respect to U.S. patent application Ser. No. 176,148 filed on Mar. 31, 1988, now U.S. Pat. No. 4,903,535.

BACKGROUND OF THE INVENTION

1. Field of the Invention

The present invention generally relates to a power converting mechanism in an electric actuator for converting rotary power into linear power, and more particularly, to a power converting mechanism in an automobile door lock device suitable for use when the rotary power of a remote-controlled motor is converted into linear power of a part to be driven (output member), thereby to automatically drive a door-lock member coupled to the driven part.

2. Description of the Prior Art

The power conversion has conventionally been carried out by employing a link or a rack-and-pinion, etc., that is, the link converting mechanism or the rack-and-pinion converting mechanism has been conventionally used for the power conversion. In the aforementioned link conversion mechanism, the relationship of the thrust (F), the input torque (T), the pitch of a link arm (L), the stroke (S) and the rocking angle ($\theta$) of the link arm is represented by equations $F = T/L$ and $S = 2 \sin \theta$. Therefore, the stroke is 2L at the largest, and a large stroke can be obtained only at the sacrifice of the thrust. On the other hand, in the case of the rack-and-pinion converting mechanism, the relationship of the pitch radius (r) of a pinion, the thrust (F) and the input torque (T) is represented by an equation $F = T/r$, resulting in limit of the reduction of speed in relation to the minimum number of teeth of the gear.

Meanwhile, for solving the above-described disadvantages in the prior art and for determining the stroke and the scale of reduction in speed freely to some extent, the use of a gear and a screw for the power conversion is proposed in Japanese Patent Laid-open Publication Tokkaisho No. 61-261587 (261587/1986).

The above gear-and-screw mechanism is of such construction that a screw 1 (a rotating shaft provided in an external thread) is interlocked with the rotation of a motor 2 through gears 3 and 4, thereby to linearly move an output member 5 screwed in the screw 1. Moreover, an output rod 6 connected to a driver lever to be operated is detachably engaged with the output member 5 by a clutch member 8 provided with a spring 7. Therefore, the above-described gear-and-screw mechanism is considerably complicated in the construction, with an increased number of parts required, resulting in high manufacturing cost and many assembling troubles.

SUMMARY OF THE INVENTION

An essential object of the present invention is to provide an electric actuator which is provided with an improved power converting mechanism employing the combination of a gear and a screw, so that the scale of speed reduction and the stroke can be determined freely, realizing assembling readiness and reduction in manufacturing cost, etc., in simple construction with a reduced number of parts.

A further object of the present invention is to provide an electric actuator which is provided with an improved clutch device and which is arranged to securely transmit the rotary power of a motor an forcibly stop the rotation of the motor when a member to be driven comes to a stop point, thereby to avoid generation of unpleasant noised of the motor in simplified structure.

A still further object of the present invention is to provide an electric actuator which is provided with an improved switch mechanism, so that the generation of chattering can be avoided, with securing the full stroke of the door lock member, even when the switch mechanism is mounted with some errors, wherein it is so arranged that the stroke of the switch can be small while the door lock member has a large stroke, resulting in compact structure and saving of space.

Another object of the present invention is to provide an electric actuator in an electric door lock system inside a door of an automobile which is arranged to avoid intrusion of water inside the actuator through a respiration hole, with securing the respiration operation, without any particular part therefor required.

In accomplishing the above-described objects, according to the present invention, a power converting mechanism is provided in an electric actuator which is comprised of a motor, a gear rotated by the motor through a centrifugal clutch, a final drive gear to be meshed with the gear, an internal thread formed in the inner peripheral surface of an axial hole formed in the center of the final drive gear, a screw passing through the axial hole of the final drive gear to be supported thereby, and an external thread formed in the outer peripheral surface of the screw. The external thread is screwed with the internal thread. On the other hand, there is formed a connection part at one end of the screw to be connected to a driven member. Accordingly, the rotary power of the motor is converted to linear power of the driven member. In the case where the driven member is manually operated, the engagement of the gear with the motor is released by the centrifugal clutch to stop the rotation of the motor.

Moreover, a clutch device is provided in the electric actuator in which a driver which is a rotating member at the input side and integrally constructed with an output shaft of the motor is provided with a weight in such a manner as to be immovable in a circumferential direction and movable in a radial direction. Moreover, a convexed portion is formed in the inner peripheral surface of a rotating drum which is loosely fitted in the driver and is a rotating member at the output side, so that the weight moving outwards in the radial direction by the centrifugal force at the rotation of the motor is engaged with the convexed portion. The engagement between the convexed portion and the weight transmits the rotation of the motor to the rotating drum. When the rotating drum is stopped, the rotation of the driver is stopped, thereby restricting the rotation of the motor.

Further, a switch mechanism is arranged in the electric actuator of the present invention. According to the arrangement, the stroke SA of an output member of the electric actuator is set larger than the stroke SL of the door lock member. At the same time, the distance of a pair of arms protruding from the output member for engagement with a switch operating tab is set to be larger than the width of the switch operating tab, with forming a clearance. The switch operating tab is loosely fitted between the pair of the arms. During operation of the actuator, first, only the output member is moved by the distance (a). Then, the switch operation tab is moved together with the output member. The necessary stroke SS, SSR for the switch is set smaller than the stroke SA of the output member, and at the same time, the stroke SS,SSR is set considerably smaller than the stroke SL of the door lock member to establish SS,SSR<<SL<SA. Accordingly, the switch mechanism can be compact in size. Even when the mounting error is given rise to and the door lock member reaches the stroke end earlier, the output member is reversed owing to the stability of a mounting panel or a coupling rod, etc. elastically deformed by the operation of the electric actuator after interruption of power supply, but the switch operating tab remains. Therefore, chattering is prevented. Moreover, because of the arrangement that the stroke SA of the door lock member is made larger than the stroke SL of the actuator, insufficient supply of power to the switch never takes place. Accordingly, the door can be locked with the full stroke of the door lock member and the door lock releasing operation can be performed with certainty.

A skirt portion for enclosing a respiration hole is integrally formed with a casing, or the skirt portion is integrally formed with a grommet when the respiration hole is formed in the portion where the grommet is mounted. Therefore, water drops running along the outer wall surface of the casing are arranged to flow tracing the outer wall surface of the skirt portion in the vicinity of the respiration hole, thereby to prevent the water drops from gathering in the respiration hole. The intrusion of water into the casing as a result of the respiration can accordingly be securely prevented.

BRIEF DESCRIPTION OF THE DRAWINGS

These and other objects and features of the present invention will become clear from the following description taken in conjunction with the preferred embodiments thereof with reference to the accompanying drawings, in which:

FIG. 2 is a cross sectional view taken along the line II—II of FIG. 1;

FIG. 3 a cross sectional view taken along the line III—III of FIG. 1;

FIG. 10 and FIG. 11 are views explanatory of the operational relationship between an output member and a switch operating tab of the electric actuator of FIG. 9;

FIG. 12 is a timing chart in the case where a mounting error is brought about in the electric actuator of FIG. 9.

FIG. 17 is an exploded perspective view of the clutch device of FIG. 14;

FIG. 18 is an exploded perspective view of the coupling device of FIG. 14;

FIG. 19, (a) to (i) including (I) to (III), is schematic views of the clutch device and coupling device for the purpose of explaining the operations of them.

DETAILED DESCRIPTION OF THE INVENTION

Figure 1:
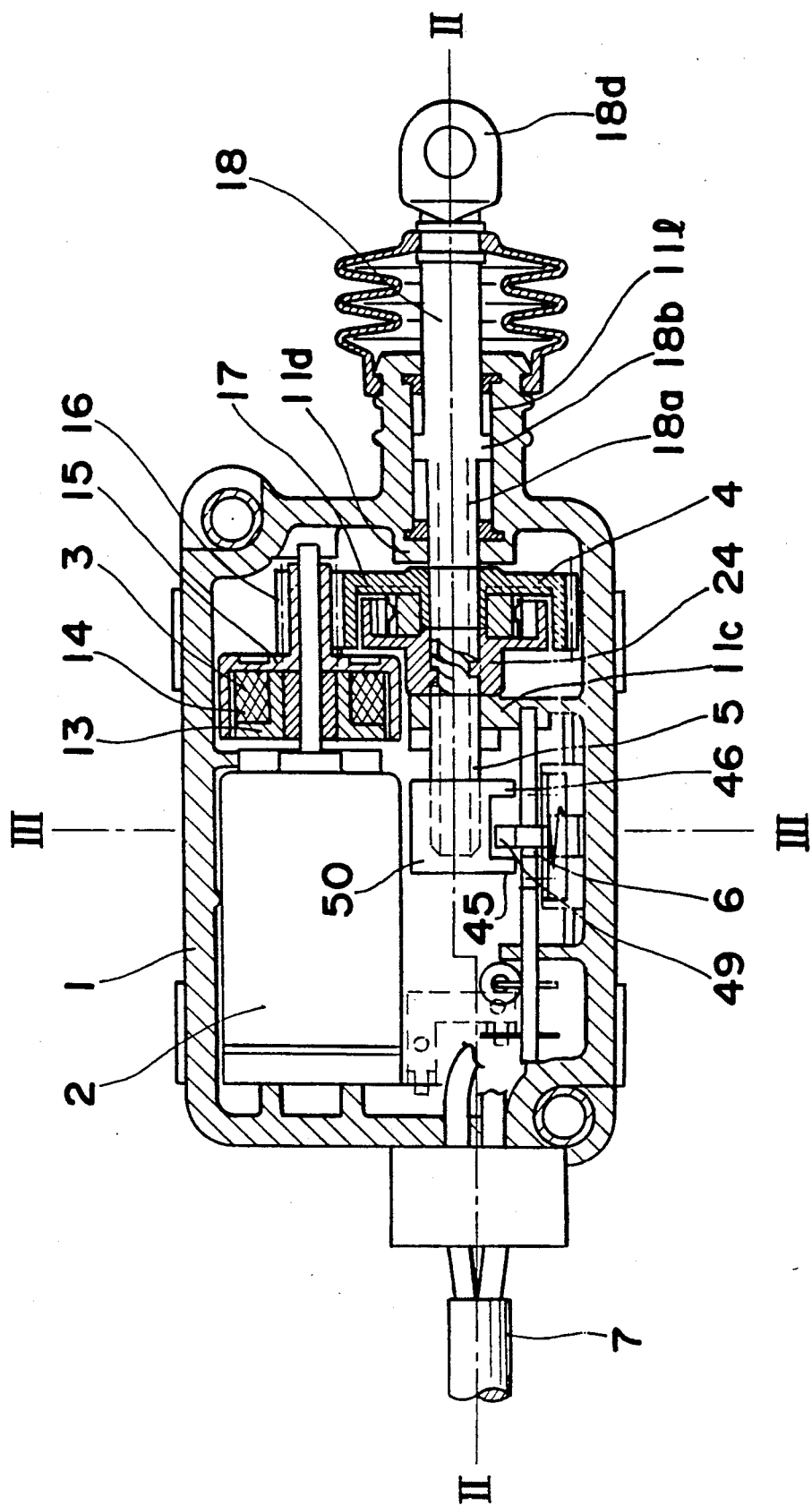
FIG. 1 is a plan view, partly cross-sectioned, of an electric actuator according to the present invention, with an upper casing removed.
Figure 4:
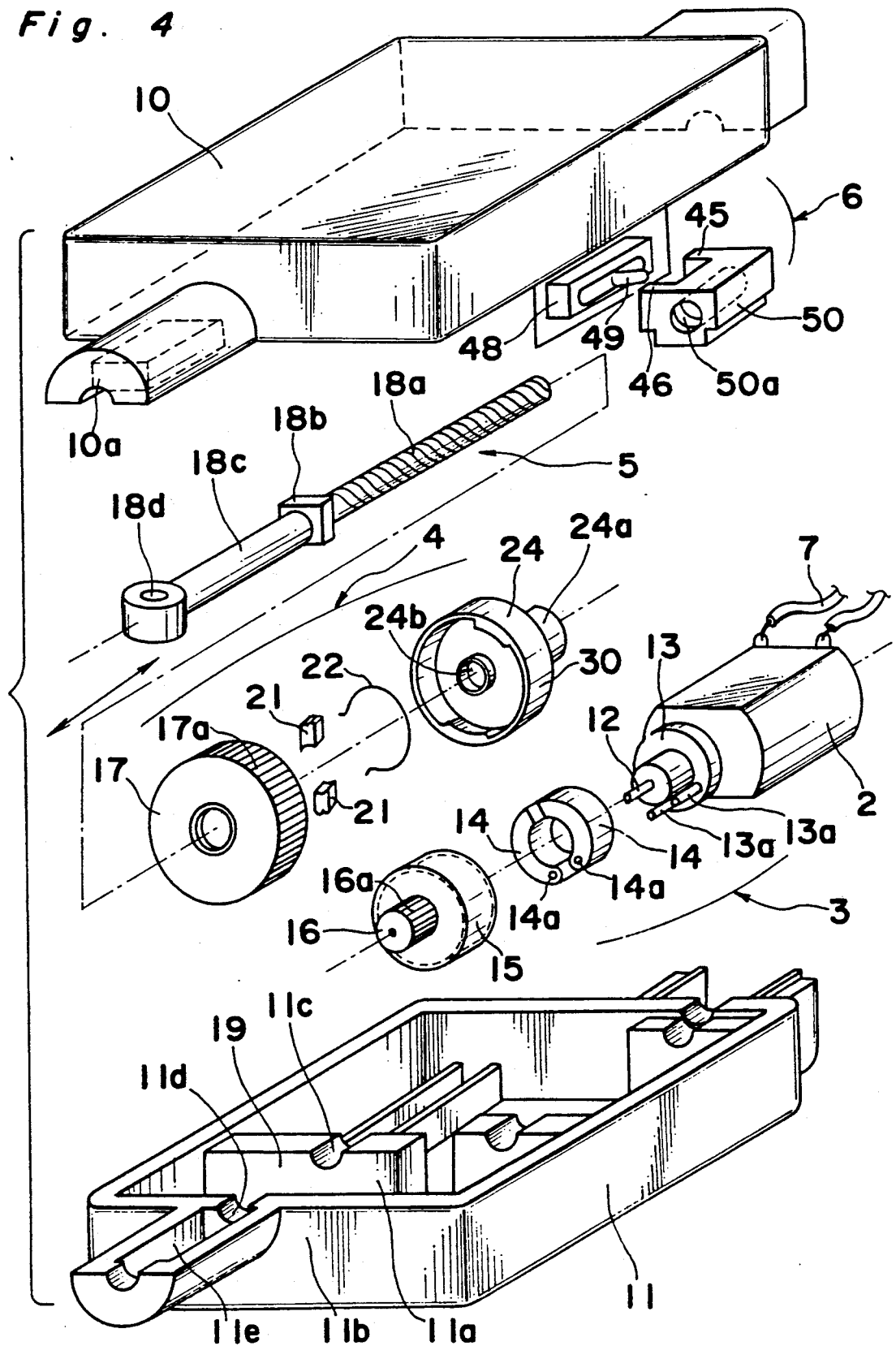
FIG. 4 is a perspective view of an essential portion of the electric actuator of FIG. 1 when it is exploded.
Figure 5:
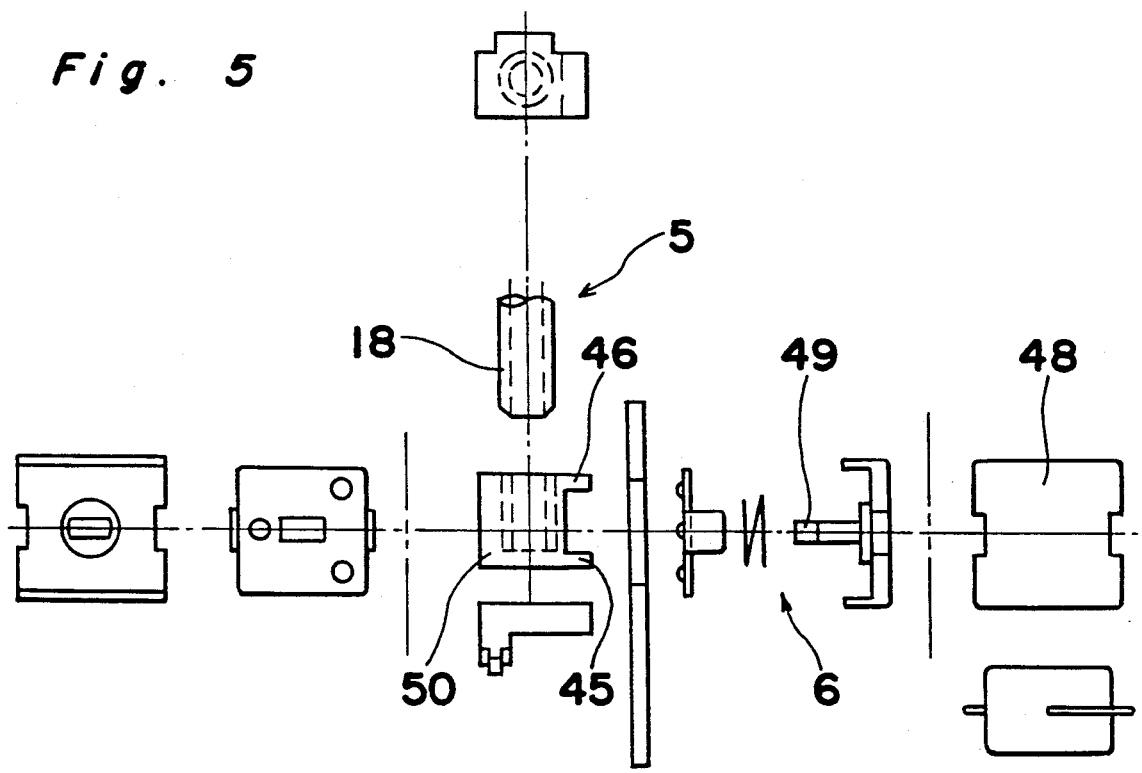
FIG. 5 is an exploded plan view of a contact mechanism of the electric actuator of FIG. 1.
Figure 6:
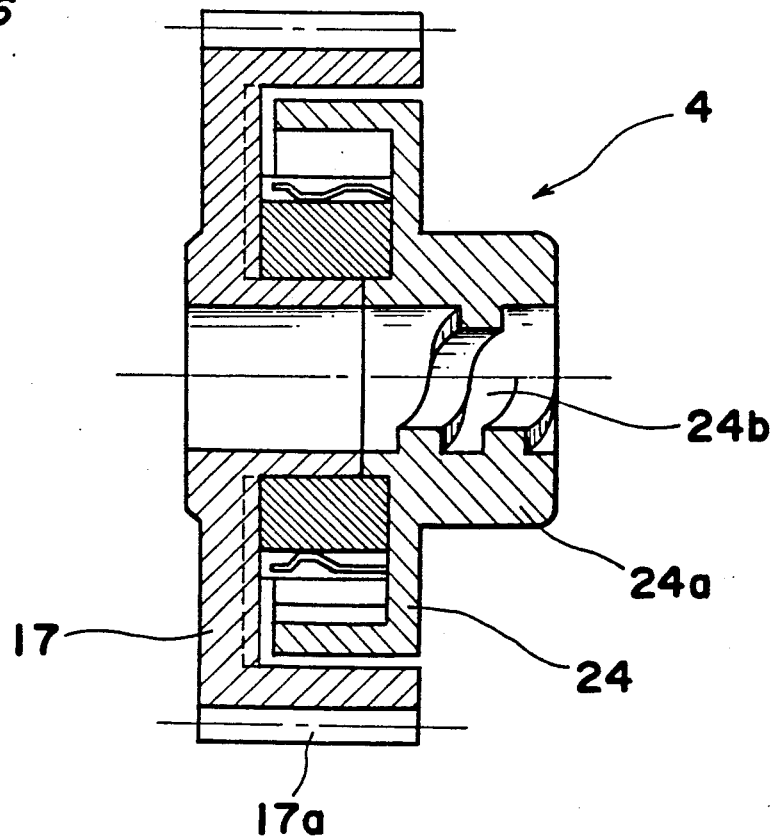
FIG. 6 is a cross sectional view, on an enlarged scale, of a clutch mechanism employed in the electric actuator of FIG. 1.

Before the description of the present invention proceeds, it is to be noted that like parts are designated by like reference numerals throughout the accompanying drawings.

With reference to FIG. 1, an electric actuator of the present invention is so assembled that after a motor 2 and every part driven by the motor 2 are mounted in a lower casing 11, and upper casing 10 is attached to the lower casing 11. The electric actuator has the motor 2, a centrifugal clutch 3, a clutch device 4, a power converting mechanism 5, and a switch mechanism 6 accommodated in a casing 1. A lead wire 7 is guided outside the casing 1.

With regards to the centrifugal clutch 3, a clutch base 13 is pressed in an output shaft 12 of the motor 2 for fixing. The clutch base 13 has protruding pins 13a and 13a rotatably fitted in holes 14a and 14a formed in a pair of semi-circular clutch plates 14 and 14. Moreover, the clutch base 13 is loosely fitted with a clutch bell 15 which is rotatably supported by the output shaft 12. When the pair of the clutch plates 14 and 14 are extended outwards in a radius direction at the fulcrum of the pins 13a and 13a by the centrifugal force upon rotation of the motor, the pair of the clutch plates 14 and 14 are pressed into contact with the inner peripheral surface of the clutch bell 15 so as to transmit the rotary power of the motor to the clutch bell 15.

With respect to the power converting mechanism 5, a gear 16 of a small diameter is integrally formed at one end of the clutch bell 15. A tooth 16a formed in the outer peripheral surface of the gear 16 is meshed with a tooth 17a of a final drive gear 17 of a larger diameter arranged in parallel relation to the gear 16. The final drive gear 17 is fitted in a drum 24 through the clutch device 4. An axial hole is formed in a central boss 24a of the drum 24, and an internal thread 24b is engraved in the inner peripheral surface of the axial hole. A screw 18 as a main shaft is passed through the axial hole of the drum 24. The internal thread 24b is screwed and coupled with an external thread 18a protruded in the outer peripheral surface of the screw 18. As shown in FIG. 1, the opposite sides of the screw 18 are fitted in respective bearing portions 11c and 11d of a partition wall 11a and an outer wall 11b in the lower casing 11, so as to slidably support the bearings. Furthermore, the final drive gear 17 is rotatably fitted in a gap between the partition wall 11a and the outer wall 11b in such a manner as to be immovable in an axial direction. Moreover, a stopper 18b in the shape of a square plate standing at the terminal of the external thread 18a of the screw 18 is fitted in a gap between guide portions 10a and 11e respectively protrudingly formed in the casings 10 and 11 so as not to be rotatable. In this construction, it can be so arranged that the stroke of the screw 18 is restricted when the stopper 18b comes into contact with the opposite end faces of the guide portions 10a and 11e. There is formed a connecting portion 18c connected to the driven part (not shown) at the end of the stopper 18b to be integral with the stopper 18b. A connecting hole 18d is formed at the end of the connecting portion 18c.

When the motor 2 of the above-described electric actuator is driven through remote control, the clutch plates 14 and 14 are rotated through the base 13 in the centrifugal clutch 3 installed in the output shaft 12. At this time, the pair of the clutch plates are pressed into contact with the inner peripheral surface of the clutch bell 15 by the centrifugal force. As a result of this, the rotary power of the motor 2 is, through the output shaft 12, the clutch base 13, the clutch plates 14 and 14, the clutch bell 15 and the gear 16, transmitted to the final drive gear 17 which is in turn rotated. Because of the rotation of the final drive gear 17, the drum 24 is rotated through the clutch device 4. Consequently, the internal thread 24b formed in the inner peripheral surface of the axial hole of the central boss 24a is rotated. Since the internal thread 24b is screwed in the external thread 18a of the screw 18, the screw 18 is linearly moved. Accordingly, the connecting portion 18d formed at one end of the screw 18 is linearly moved as shown by an arrow, thereby to automatically drive the interlocking door lock member.

In the manner as above, when the rotary power of the motor 2 is converted to the linear power for the screw 18 which has the connecting portion to be connected to the driven member, the scale of the reduction in speed can be adjusted freely by the mesh of the gears 16 and 17, and a suitable large torque can be obtained. At the same time, by properly determining the angle of torsion of the external thread 18a of the screw 18 and the internal thread 24b of the drum 24, the thrust can be set freely within some range and moreover, by arranging the length of the guide portion 10a upon necessity, the stroke can be also set freely.

In the meantime, when supply of electricity is interrupted, the centrifugal force of the pair of the clutch plates 14 and 14 is lost in the centrifugal clutch. Therefore, the pressing force against the inner peripheral surface of the clutch bell 15 is scarcely remaining or completely lost. Thus, when the door lock member is manually operated, the screw 18 is moved, and consequently the gears 17 and 16 are rotated, but the motor 2 is not rotated by the centrifugal clutch, enabling easy manual operation from outside.

Further, in the case where the above-described electric actuator is installed in a keyless door lock mechanism, when the door is closed without an outer handle pulled out, the auto-unlock (self-cancellation) system is effected, resulting in abrupt operation of the actuator from outside. In the above embodiment, however, an armature of the motor 2 and the clutch plates 14, etc. which have large inertial mass are shut off by the centrifugal clutch 3 and the clutch device 4, and accordingly, those parts are not moved at the operation from outside. Thus, the breakage of the interior of the actuator or the poor operation in self cancellation system can be avoided.

The present invention is not restricted to the above-described embodiment. Although the motor 2 and the screw 18 are arranged in parallel relation in the aforementioned embodiment, it may be possible by using a bevel gear that the motor 2 is arranged with right angles with respect to the screw 18. Further, the clutch is not limited to the above-described embodiment. A centrifugal clutch of a pinless (pivotless) type may be employed. If the centrifugal clutch of the pinless type is employed, the clutch plates fitted in the clutch base are pressed into contact with the inner peripheral surface of the clutch bell by the centrifugal force, thereby to transmit the rotary power. Moreover, if the clutch plate of FIG. 1 is mounted with a return spring, light and easy manual operation from outside can be realized regardless of the mounting position of the actuator.

The clutch device 4 will be described in more detail.

Figure 7:
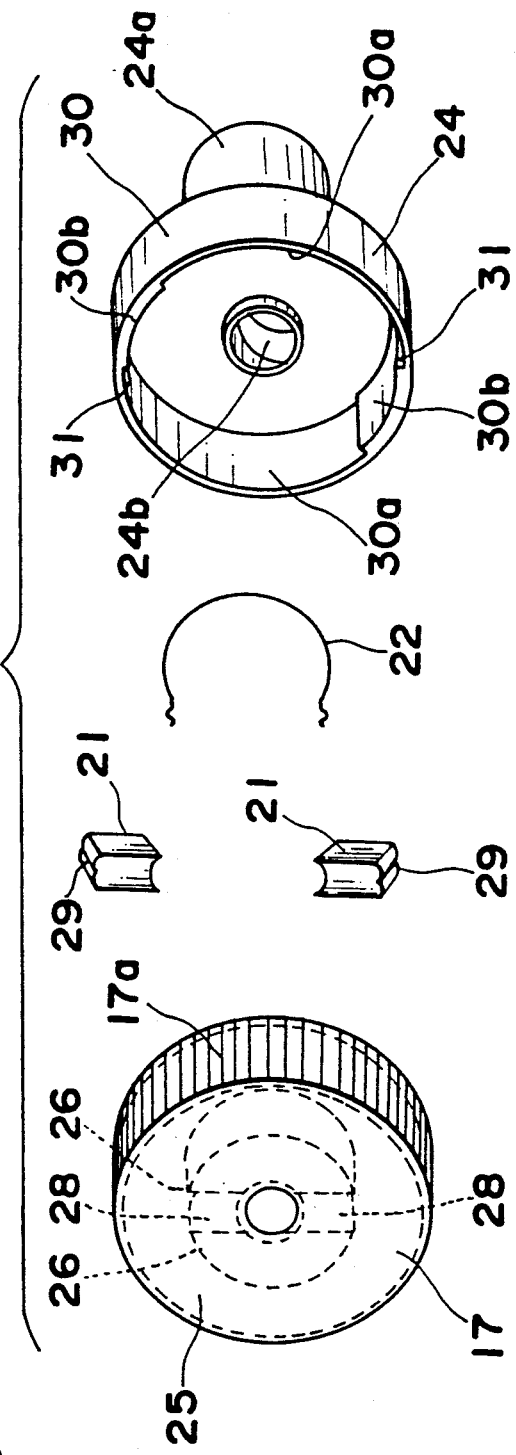
FIG. 7 is a perspective view of an essential portion of the clutch mechanism of FIG. 6 when it is exploded.

The clutch device 4 is comprised of the final drive gear 17 which is a rotating member at the input side, a pair of weights 21 and 21, a spring 22 and the rotating drum 24 which is a rotating member at the output side. The final drive gear 17 has, as shown in FIG. 7, a disk part 25 formed in the outer periphery at the lower end of an axial portion fitted in the main shaft of the screw 18. There are standing partition walls 26 and 26 separated 180° from one another on the disk part 25. Each partition wall 26 has a groove (not shown) notched in the outer end surface thereof so as to be engaged with the spring. The weight 21 which is centrifugally moved by the rotation of the motor is made of a heavy metal in the shape of a fan to be fitted with a fan-shaped storing space 28 defined by the partition walls 26 and 26. Each of the weights 21 and 21 is placed on the disk part 25 of the final drive gear 17 to be accommodated in the corresponding storing space 28 in such a manner as to be unmovable in a circumferential direction and movable in a radial direction. In the outer peripheral surface of the weight 21 is formed an engagement groove 29 to be engaged with the spring. The partly-notched circular spring 22 is engaged with the groove of the partition wall 26, and also with the engagement groove 29 of the weight 21, so that each of the weights 21 and 21 which projects by its centrifugal operation can be accommodated in the storing space 28 when the motor 2 is stopped. The rotary drum 24 is formed with the internal thread 24b in the axial hole of the central boss 24a outfitted in the screw 18. The boss is rotatably butted against the external thread 18a in the axial part of the final drive gear 17. The rotating drum 24 is further provided with a cylindrical part 30 in the outer periphery thereof, which cylindrical part 30 is rotatably fitted inside the final drive gear 17. The inner peripheral surface of the cylindrical part 30 is defined alternately to be a large diameter portion and a small diameter portion separated 180° from each other. In other words, a pair of recessed portions 30a and 30a are defined in the large diameter portion and a pair of convexed portions 30b and 30b are formed in the small diameter portion. A stepped face 31 is formed between the recessed portion 30a and the convexed portion 30b in a radial direction for engagement with the weight.

In the clutch device having the above-described construction, since the weight 21 is normally urged by the spring 22 in the cylindrical part 30 of the rotating drum 24, the weight 21 is not in touch with the inner peripheral surface of the convexed portion 30b, nor is it connected to the rotating drum 24. When the motor 2 is driven by remote control, the final drive gear 17 is accordingly rotated, and also the weight 21 and the spring 22 accommodated in the final drive gear 17 are rotated. Consequent to the rotation, the weight 21 is pushed outwards by the centrifugal force in a radius direction against the spring 22. Then the weight 21 is fitted in the recessed portion 30a of the rotating drum 24, with the one end face of the weight 21 being engaged with the stepped surface 31. Therefore, the rotary power of the motor 2 is transmitted to the rotating drum 24, thereby rotating the final drive gear 17, the weight 21 and the rotating drum 24 all together. At this time, even if the motor 2 is burdened with some load, and the rotation of the motor 2 is deteriorated, the rotary power of the motor 2 is securely transmitted to the rotating drum 24 so long as the weight 21 is engaged with the stepped face 31.

When the electricity is stopped being supplied to the motor 2, the weight 21 is depressed towards the central direction by the repulsion of the spring 22. As a result, the weight 21 is accommodated in the storing space 28 of the final drive gear 17 and returned to the state where the engagement with the rotating drum 24 is released. While the supply of the electric power to the motor 2 is stopped, the driven members after the rotating drum 24 are in the free state. Therefore, when the door lock operation is manually carried out to drive the lever, only the final drive gear 17 is idly rotated, and the motor 2 is never rotated. Accordingly, the door lock operation can be easily performed through manual operation with no large force required.

Figure 8:
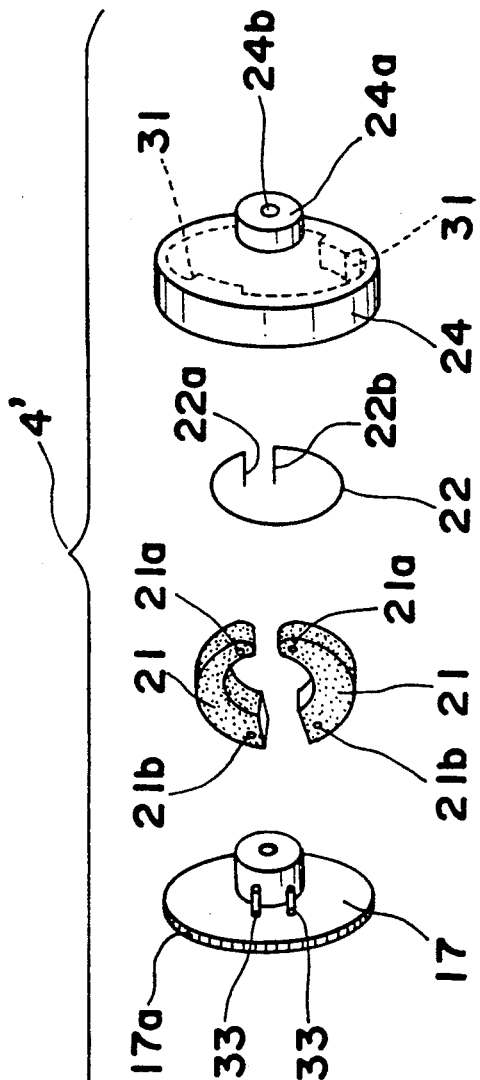
FIG. 8 is a perspective view of a modification of FIG. 7.

FIG. 8 shows a modified embodiment of the clutch device. The weight of the modified device is of a pivot type. The pair of the weights 21 and 21 are formed in semi-circular shape, at the one end of each of which is formed a fitting aperture 21a for a pin 33 and at the other end of each of which is formed an engagement hole 21b for the spring 22. The final drive gear 17 has two pins 33, instead of the partition walls 26, provided adjoining the disk part 25. Each pin 33 is fitted in the pin fitting aperture 21a of the weight 21. The weights 21 are rotatably arranged in a circular configuration around the pins 33. In addition, the spring 22 is mounted in the outer peripheral surface of the weight 21. Bending portions 22a and 22b at the opposite ends of the spring 22 are inserted in and engaged with the engagement holes 21b of the weight 21, so that the front ends of the weights 21 are urged by the spring 22 to approach each other. In this modified embodiment, when the final drive gear 17 is rotated consequent to the rotation of the motor, the front ends of the weights 21 are extended outwards by the centrifugal force against the force of the spring 22, and the front end of each weight is brought in engagement with the convexed stepped face 31 of the rotating drum 24. Thus, the rotation of the motor is transmitted to the rotating drum 24. When the electric power supply to the motor 2 is interrupted, the weights 21 are so urged by the spring 22 as to come closer to each other, thereby cutting the engagement of the weights to the rotating drum 24. The modified embodiment described above is accordingly advantageous in simplified structure of the final drive gear 17.

Next, the switch mechanism of the electric actuator will be described hereinbelow in more detail.

Figure 9:
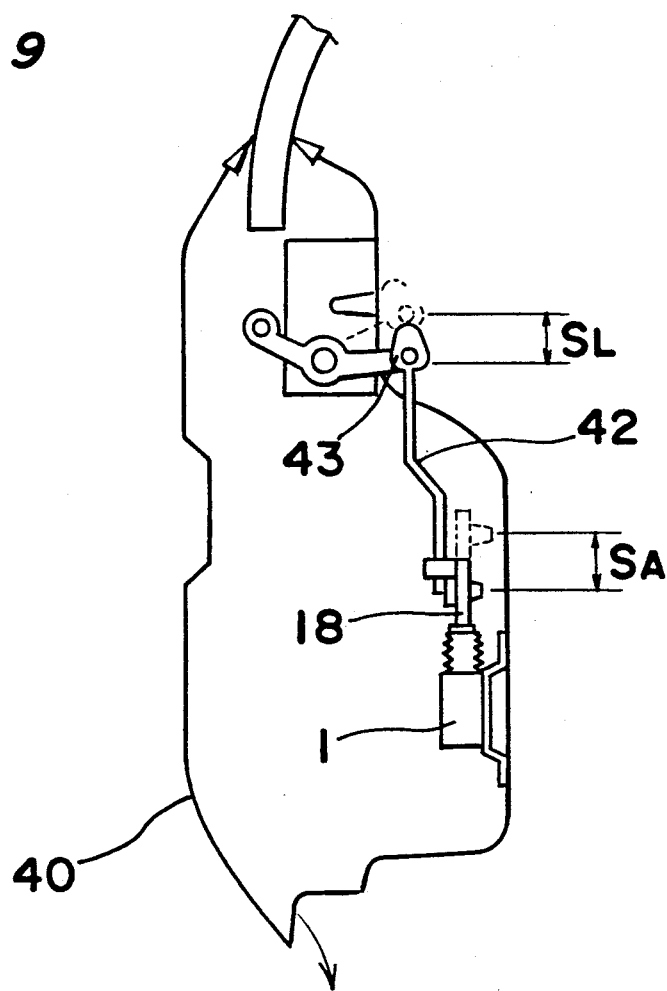
FIG. 9 is a view schematically showing the structure of the electric actuator of FIG. 1 when it is installed in an automobile door.

Referring to FIG. 9, the electric actuator is installed inside a door 40. A coupling rod 42 is connected to one end of an output member 50 having an internal thread 50a and provided at the front end of the screw 18. At the other end of the coupling rod 42 is connected a door lock member 43 of the driven member. In the case where the door lock member 43 is automatically operated, and when the motor of the electric actuator in the door 40 is supplied with electricity through remote control from a driver's seat, the final drive gear 17 is rotated. Then, one end of the output member 50 of the screw 18 which is meshed with the final drive gear 17 through the power converting mechanism and the clutch device is linearly moved. Corresponding to the movement of the output member 50, the door lock member 43 is driven through the coupling rod 42 so as to automatically lock or unlock the door 40.

Arms 45 and 46 for engagement with a switch operating tab 49 are protrudingly provided at the opposite ends of the output member 50. A recess 47 is formed between the arms 45 and 46 which are confronting each other. The operating tab 49 of a limit switch 48 is loosely fitted in the recessed portion 47. In this case, the distance between the arms 45 and 46 is set to be larger than the width of the operating tab 49 by the distance (a), namely, the clearance (a). Because there is provided the clearance (a), the moving stroke of the switch operating tab 49 is set smaller than the stroke of the output member 50 by the clearance (a). In the limit switch 48, when the operating tab 49 comes to a position (P,P') separated a little with respect to the stroke end at the opposite ends of the guide portions 10a and 11d in the switch casing, it is the position to be detected when the supply of electricity to the motor 2 should be interrupted. The charging stroke of the limit switch 48 SS,SSR is set to be considerably smaller than the stroke SL of the door lock member 43. Therefore, the relationship of the door lock stroke SL, the actuator (output member) stroke SA and the switch charging stroke SS,SSR is determined as follows.

$$SS,SSR < < SL < SA$$

The operation of the above-described switch mechanism will be explained.

When the motor 2 is supplied with electricity and the final drive gear 17 is rotated in a direction shown by an arrow, the output member 50 is linearly moved in the direction shown by the arrow. In this case, as shown in FIG. 10, the operating tab 49 is, in the beginning, in pressed contact with the arm 45, with the distance (a) separated from the arm 46, and accordingly only the output member 50 is moved while the operating tab 49 is left behind. After the output member 50 is moved (a) distance, the arm 46 is contacted with the operating tab 49. In consequence, the output member 50, together with the operating tab 49, is moved. When the operating tab 49 is moved a predetermined distance to reach the position P, the supply of electricity to the motor 2 is interrupted. Similarly, when the motor 2 is reversed and both the output member 50 and the operating tab 49 are moved in an opposite direction, since the operating tab 49 is at first in contact with the arm 46, with the distance (a) kept from the arm 45, as shown in FIG. 11, only the output member 50 is moved. Thereafter, when the output member 50 is moved the distance (a), the arm 45 is brought in contact with the operating tab 49, so that the output member 50 is moved integrally with the operating tab 49. When the output member 50 comes to the position P', the supply of electricity is interrupted. Thus, in the manner as above, when the output member 50 is moved, first, only the output member 50 is moved and the operating tab 49 is left behind. Then, after the output member 50 is moved a predetermined distance (the distance (a)), the operating tab 49 is moved together with the output member 50. Therefore, the stroke of the operating tab 49 can be rendered small.

Even if the door lock member 43 is positioned with some error or the length of the coupling rod 42 is erroneously set, since the stroke of the door lock member 43 is set larger than the stroke SA of the output member 50 as indicated in a timing chart of FIG. 12, the output member 50 and the operating tab 49 are arranged to reach the terminal point of the stroke earlier than the door lock member 43, to stop the supply of electricity, thereby to avoid such accident that the door lock member 43 can not be moved with full stroke. Moreover, contrary to the above, even when the door lock member 43 comes earlier to the end of the stroke, after the interruption of the power supply, the output member 50 is reversed and moved in the opposite direction by the stability of the mounting panel, the coupling rod, etc. which are elastically deformed because of the operation power of the electric actuator, but the output member 50 starts moving with the operating tab 49 remaining in the beginning. Therefore, chattering is never brought about.

Figure 13:
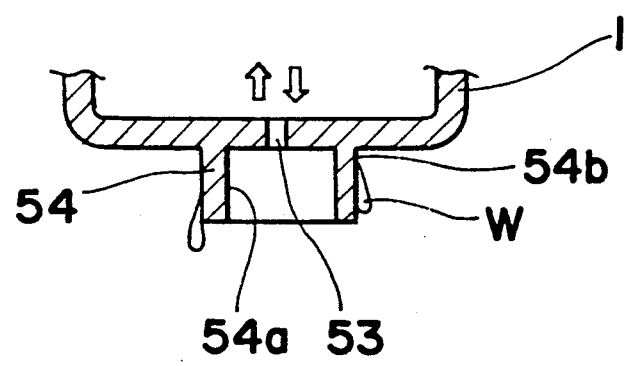
FIGS. 13(A) and 13(B) are respectively a cross sectional view and a bottom view of a part of a casing of the electric actuator of FIG. 1.
Figure 13:
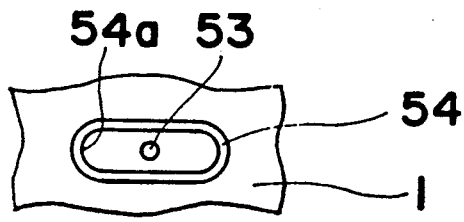

In the embodiment shown in FIG. 1, a skirt portion 54 is protruded downwards from the outer periphery of a respiration hole 53 opened at the bottom of the casing 1. The skirt portion 54 is integrally formed with the casing 1. As indicated in FIGS. 13(A) and 13(B), the skirt portion 54 is so arranged that the inner peripheral surface 54a thereof is positioned as far as possible from the respiration hole 53. At the same time, the sectional area and the configuration of the skirt portion 54 are so designed as not to gather water thereat by the surface tension and the capillary action. The cross section of the skirt portion 54 is oval as shown in FIG. 13(B) according to the present embodiment, but it may be polygonal.

Owing to the above-described construction, the water running along the outer wall surface of the casing 1 falls down along the outer peripheral surface 54b of the skirt portion 54. Simultaneously, even if the water W rises along the inner peripheral surface 54a of the skirt portion 54 by the capillary phenomenon, since the skirt portion 54 is kept away from the respiration hole 53, the water does not fall in the respiration hole 53. Accordingly, it can be prevented that the water gathers at the opening mouth of the respiration hole 53, and the water invades into the respiration hole 53. Therefore, in the case where a bellows 56 is provided between the upper end of the casing 1 and the driven lever 55, the water can be surely prevented from entering the casing 1 through the respiration hole 53 even by the respiration of the actuator.

As a modification of the present invention, the respiration hole may be formed in a grommet for guiding the lead wire. In this case, a protruded part is formed at the bottom of the casing 50 so as to be fitted in with the grommet. The respiration hole is formed in the center of the protruded part, and a guide hole for introducing the lead wire is formed at a position separated from the respiration hole.

Meanwhile, the grommet to be fitted in the protruded part has an H-shaped cross section. The upper half of the grommet is outfitted in the protruded part, from which the skirt portion is projected. A respiration hole is formed in the center of the lateral cross section of the grommet fitted in the bottom surface of the protruded part, with a guide hole for the lead wire formed away from the respiration hole. The lead wire for supply of electricity and for transmission of signals is inserted from the guide hole of the grommet through the guide hole in the protruded part into the casing 50.

According to the modified embodiment also, the water drops flowing along the outer peripheral surface of the grommet from the outer wall surface of the casing 50 are guided down along the skirt portion, thereby to prevent gathering of the water drops in the respiration hole away from the skirt portion. Therefore, it is advantageous that the water drops do not intrude inside the casing 50 from the respiration hole in the protruded part through the respiration hole of the casing.

As has been described hereinabove, the power converting mechanism provided in the electric actuator of the present invention advantageously makes it possible to freely set the scale of the speed reduction and the stroke, and to reduce the number of parts remarkably as compared with the prior art. Specifically, the connecting portion to be connected with the driven member is integrally formed with the screw engaged with the final drive gear, and moreover the screw is supported by the bearing portion integrally formed with the casing. The final drive gear is supported by the screw. Accordingly, no special component is necessary for the rotating bearing of the final drive gear, resulting in considerable reduction of the number of component parts. Consequently, the cost of parts is reduced, and assembling operation can be conducted with much ease.

Furthermore, according to the clutch device of the electric actuator of the present invention, the driver integrally formed with an output shaft of the motor is provided with a pair of weights in such a manner that the weights can not be moved in a circumferential direction. On the other hand, a convexed portion is formed in the inner peripheral surface of the rotating drum at the output side which is loosely fitted in the driver, so that the weight moving outwards in a radial direction by the centrifugal force at the rotation of the motor is engaged with the convexed portion. Accordingly, the rotary power of the motor is transmitted to the rotating drum owing to the engagement of the weight with the convexed portion. Moreover, when the rotating drum is stopped, the rotation of the driver is stopped, restricting the rotation of the motor. Thus, when the operating member interlocking with at the side of the rotating drum, for example, the door lock member reaches a predetermined position to be stopped, consequently stopping the rotating drum, the weight of the clutch device is idly rotated, and therefore unpleasant noises can be prevented from being generated between the rotating drum and the clutch device. Moreover, when the operating member is driven by the motor through the clutch device, the rotating power of the motor is transmitted because of the engagement of the weight moving outwards by the centrifugal force with the convexed portion formed in the inner peripheral surface of the rotating drum. As a result, even when the rotation of the motor is deteriorated, the engagement is never easily released, with ensuring safe transmission of the rotation of the motor to the rotating drum at the output side. Therefore, it is advantageous that the capacity of the motor can be utilized to the maximum, resulting in compact structure of the motor, according to the clutch device of the electric actuator of the present invention.

Since the switch charging stroke is set considerably smaller than the door lock stroke in the switch mechanism of the electric actuator of the present invention, the switch can be rendered compact in size, saving space, even in the case where the door lock stroke is large. In comparison with the prior art, the switch mechanism is so simple in structure that the operating tab of the switch can be engaged with the arms if only a pair of arms projecting from the output member are extended, resulting in low manufacturing cost. In addition, chattering can be advantageously avoided even when the switch mechanism is mounted with some errors. Moreover, even insufficient supply of electricity to the switch does not hinder the door lock member to move with full stroke. Accordingly, owing to the switch mechanism of the electric actuator of the present invention, the door lock member is able to be automatically operated with certainty.

The skirt portion is integrally formed with the casing so as to enclose the respiration hole formed in the bottom of the casing, or the skirt portion is integrally formed with the grommet in the case where the respiration hole is formed in the grommet. Accordingly, the water drops falling down the outer wall surface of the casing are arranged to flow along the outer wall surface of the skirt portion. Thus, the gathering of water drops in the opening mouth portion of the respiration hole can be prevented and, if the water do gather, they are sucked into the casing by the respiration of the bellows. Moreover, since the skirt portion is formed integrally with the casing or grommet, without requiring any particular part other than in the prior art, in order to fulfill the objects of the present invention, the increase of the manufacturing cost can be avoided. Moreover, such lengthy pipe is not employed in the present electric actuator as in the prior art, and the respiration hole is opened within the skirt portion, so that normal respiration is assured at all times.

Figure 14:
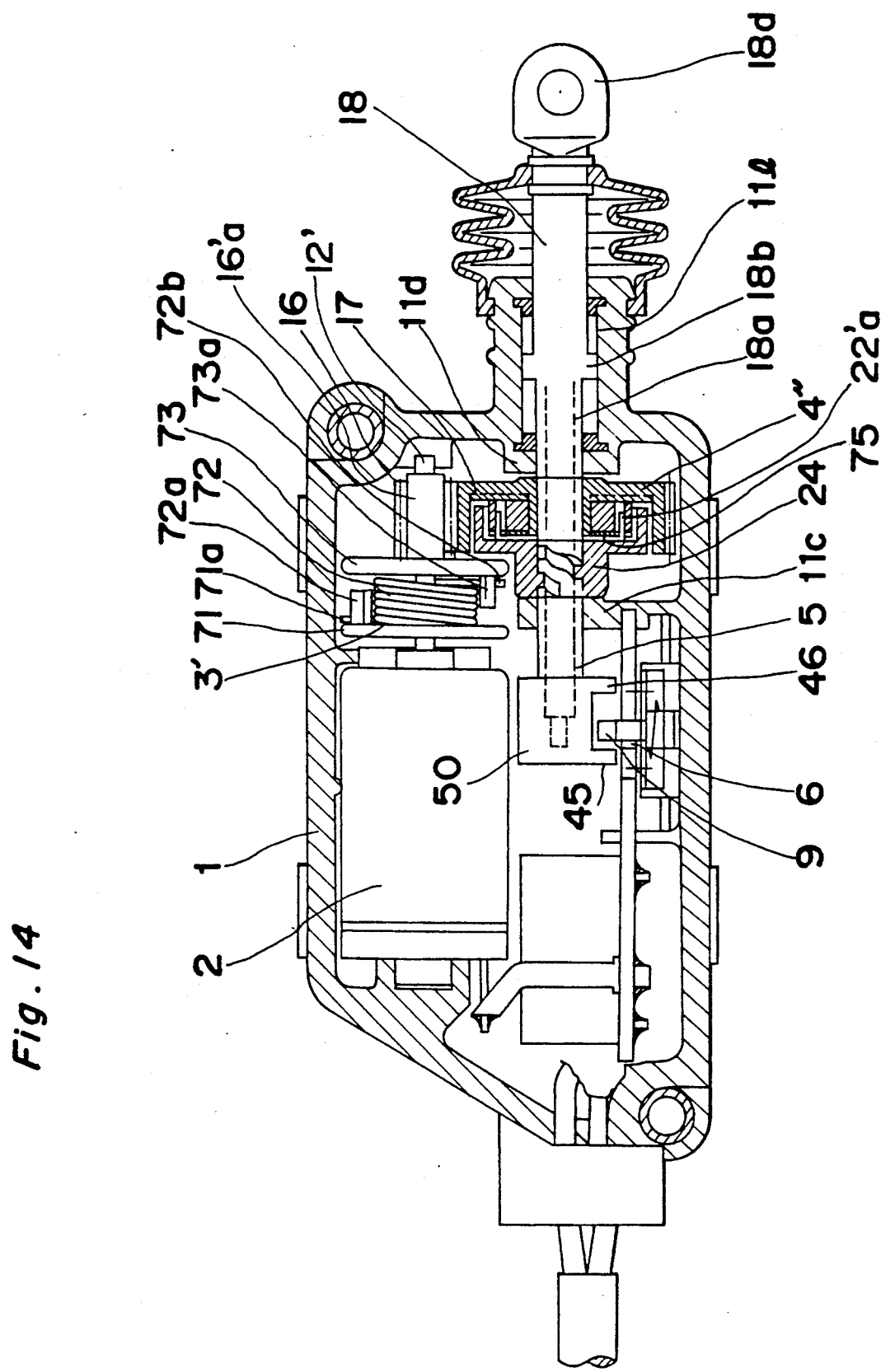
FIG. 14 is a plan view similar to FIG. 1, but showing a modification of the electric actuator of FIG. 1.
Figure 16:
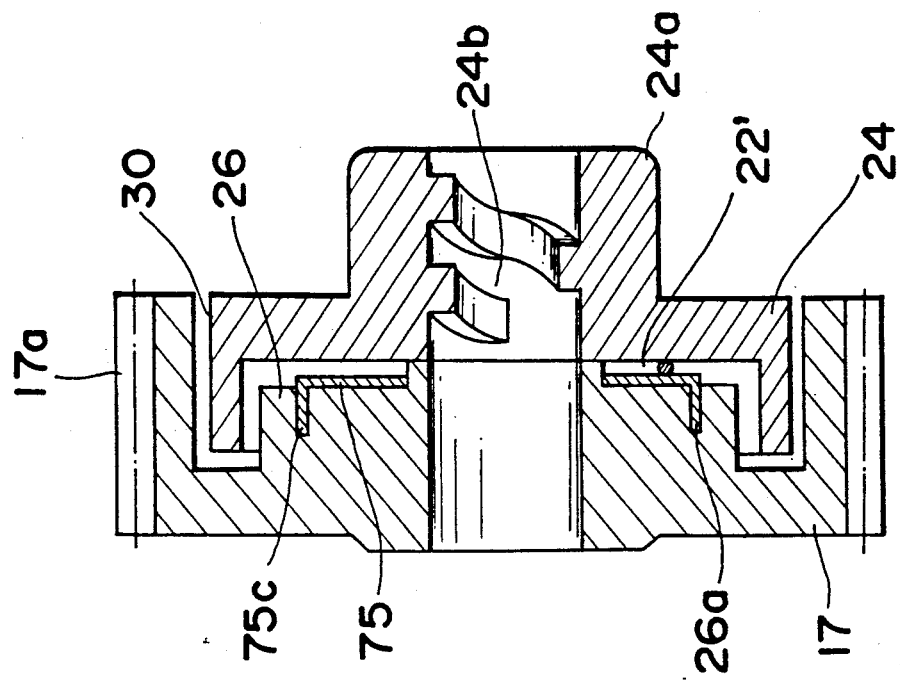
FIG. 16 is a cross-sectional view taken along a line of XVI-XVI of FIG. 15.
Figure 15:
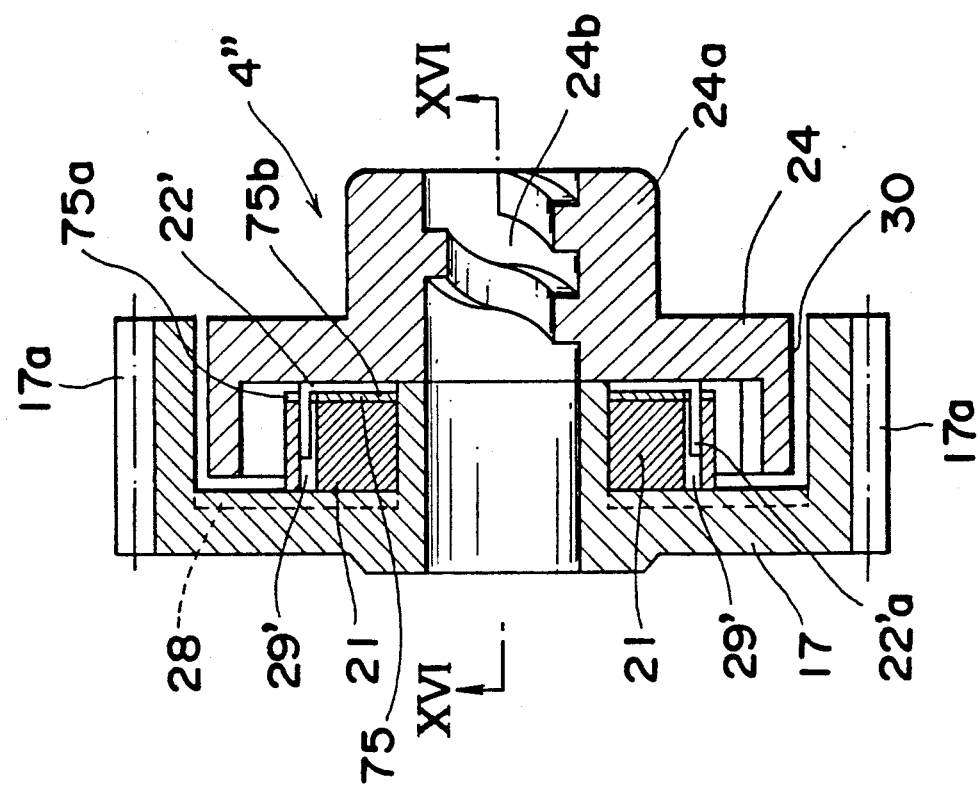
FIG. 15 is a cross-sectional view, on an enlarged scale, of the clutch device of FIG. 14.

In the other embodiment of the present invention, the centrifugal clutch 3 of FIG. 1 can be eliminated in replacing with a coupling device 3' provided between the motor 2 and clutch device 4", as shown in FIG. 14. FIG. 14 shows an electric actuator which comprises the motor 2 provided with an output shaft, a gear means 16 including the coupling device 3', and coupled onto the output shaft 12' of the motor 2, a final drive gear 17 meshing with the gear means 16, a drum member 24 disposed concentric with the final drive gear 17 and provided with a boss portion 24a having an internal thread 24b formed in an inner peripheral surface of its central axial opening, the clutch device 4" of type being centrifugally actuated provided between the final drive gear 17 and drum member 24, and a screw 18 passing through the central axial opening of the boss portion 24a and having an external thread 18a formed on its outer peripheral surface and a connecting portion 18d provided at one end of the screw 18 to be connected with a driven member to be driven, whereby the rotation of the motor 2 can be converted into a linear movement of the driven member through the coupling device 3', clutch device 4" and screw 18. The gear member 16'a comprises a gear plate 73 having a gear at one side and a pair of fitting strips 73a, 73a at the other side and rotatably mounted on the output shaft 12' of the motor 2. The coupling device 3' comprises the fitting strips 73a of the gear member 16'a, a coil spring 72 having a pair of engaging ends and a coil plate 71 having a pair of lugs 71a, 71a at its left and right sides with providing a given distance therebetween, the coil plate 71 being fixedly mounted on the output shaft 12' of the motor 2, and one end 72b of the coil spring 72 being inserted between the fitting strips 73a, 73a while the other end 72a of the coil spring 72 is placed between the pair of lug 71a, 71a, as shown in FIG. 19(I). The rotation of the motor 2 is transferred to the gear member 16'a through the coil spring 72 of which one end 72b is engaged with the gear member 16'a through the fitting strips 73a while the other end 72a of which is engaged with either one of the pair of lugs 71a of the coil plate 71 in accordance with the rotational direction of the output shaft 12' of the motor 2. The clutch device 4" of this embodiment is constructed in the same manner of that of FIG. 7, except of providing a washer 75 for guiding a ring spring 22, so as to keep a pair of weights 21', 21' at the right positions within the storing spaces 28, 28 of the disk part having the final drive gear 27, and of providing a hole 29' for receiving a straight end 22a', of the ring spring 22 on the weight 21' in place of the engagement groove 75a of FIG. 17, as shown in FIGS. 15 and 16. The operation of the clutch device 4" is the same to that of the clutch device of FIG. 7. On the other hand, the coil spring 72 of the coupling device 3' is provided for the purpose of promoting the disengaging of the weight 21' from the step face 31 of the convexed portion 30b of the cylindrical part 24 when the motor 2 is stopped so as to facilitate the restart of the motor 2 under no-loading of the weight 21' being disposed apart from the step face 31 of the convexed portion 30b of the cylindrical part 24, as shown in FIG. 19. FIG. 19 shows in sequence various positions of the coupling device 3' in association with the clutch device 4", wherein a drawing (a) shows a first position of disengaging the clutch device 4" under stopping of the motor 2 with placing the both ends 72a, 72b of the coil spring 72 at free between the fitting strips 73a, 73a and lugs 71a, 71a, respectively, a drawing (b) a second position of disengaging the clutch device 4" at the time of restarting the motor 2 under engaging the both ends 72a, 72b of the coil spring 72 with the fitting strips 73a and one 71a of the lugs, respectively, a drawing (c) a third position of engaging the clutch device 4" during the rotation of the motor 2, a drawing (d) a fourth position of engaging the clutch device 4" with restraining both of the gear plate 73 and cylindrical part 24 during upon the screw 18 being reached to the end of moving the rotation of the motor 2, a drawing (e) a fifth position of engaging the clutch device 4" upon restricting the coil plate 71, gear plate 73 and cylindrical part 24 at the time of stopping the motor 2, a drawing (f) a sixth position of engaging the clutch device 4" under rotating backward only the coil plate 71 with the motor armature by the urging force of the coil spring 72 for an angle of without moving of the gear plate 73, a drawing (g) a seventh position of engaging the clutch device 4" upon striking the one of the fitting strip 73a of the gear plate 73 by the end of the coil spring 72 to return back the coil spring 72 in free state and the coil plate 71 with the motor armature, a drawing (h) a eighth position of disengaging the clutch device 4" upon rotating backward the coil plate 71 together with the gear plate 73 by striking of the end of the coil spring 72 onto the fitting strip 73a, a drawing (i) a ninth position of disengaging the clutch device 4" upon stopping the coil plate 71, gear plate 73 and disk part 25 as well as the cylindrical part 24 to return back the actuator to the initial first position as shown in FIG. 19 (III), the screw 18 is rendered to project outwardly from the casing 10 by the rotation of the cylindrical part 24 for a certain distance of the moving stroke in the same manner of the actuator in the embodiment of FIG. 1.

Figure 20:
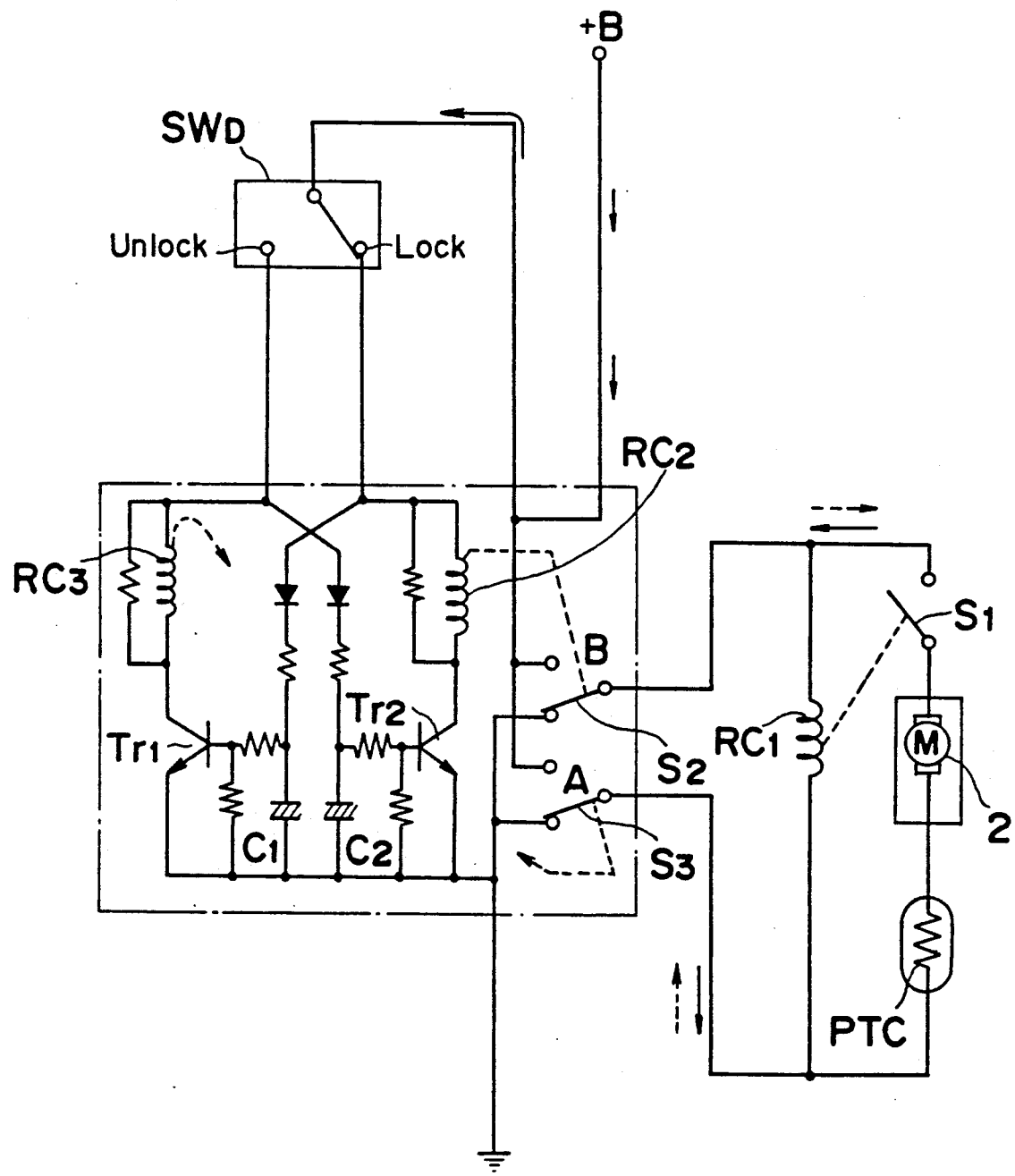
FIG. 20 is an electric circuit for driving a motor associated with the electric actuator of the present invention for use in an automobile door lock device.

FIG. 20 shows an electric circuit of one example for driving the motor 2 for use in an automobile door lock device, providing with a relay coil RC1 for a relay switch S1 of the motor 2, a door lock switch SWD including a pair of lock and unlock positions and a controller including two set of relay coils RC2, RC3 and a time constant circuit having a pair of transistors Tr1, Tr2, resistors and capacitors C1, C2 for controlling the operating time of the motor 2, one set RC3 of the relay coils being energized to turn a first switch S3 on upon the lock position of the door lock switch SWD while the other set RC2 of the relay coils is energized to turn a second switch S2 on upon the unlock position of the door lock switch SWD, whereby, when the power source is turned off, the relay switch S1 is opened upon turning the relay off to eliminate an electric brake function of the electric circuit so as to produce the large amount of the reverse movement of the weight 21' against the step face 31 of the convexed portion 30b of the cylindrical part 24.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electric actuator provided with a power converting mechanism, said power converting mechanism comprising:
    a motor provided with an output shaft,
    gear means coupled to the output shaft of said motor to transmit the rotation thereof, and including a coupling apparatus
    a plate member fixedly mounted on the output shaft of said motor and provided with a pair of projections having a gap therebetween,
    a gear member slidably mounted on the output shaft of said motor and provided with a gear at one side and a fitting strip at the other side,
    spring means having a pair of fitting ends one of which is fitted with the fitting strip of said gear member and the other of which is fitted with the pair of projections of said plate member,
    a final drive gear meshing with said gear means,
    a drum member being concentric with said final drive gear and provided with a boss portion having an internal thread formed in an inner peripheral surface of a central axial opening,
    centrifugally actuated clutch means provided between the final drive gear and the drum member, and
    a screw member passing through the central axial opening of said boss portion and having an external thread formed on the outer peripheral surface and threadly engaged with said internal thread of said drum member, and a connecting portion formed on one end and connected to a driven member to be driven,
    whereby rotational movement of said motor is converted into linear movement of said driven member.

2. The electric actuator as defined in claim 1 wherein
    the plate member of said coupling apparatus is formed integrally with a boss portion to be passed through the output shaft of said motor and a plate portion formed with the pair of aid projections,
    the spring means having a coil portion slidably mounted in the boss portion of the plate member and a pair of fitting portions outwardly extending from a side plane of said coil portion, and
    the gear member being slidably mounted with the output of the motor and includes fitting strips having a gear at the one side and a pair of projections at the other side.

3. The electric actuator as defined in claim 1 wherein
    the centrifugally actuated clutch means being formed around the axial center of said final drive gear, and includes a partition wall having at least one storing space, a weight adapted to be projected outwardly by the rotation, and a ring spring for returning the projected weight back to the storing space, and
    the drum member being formed with a convexed portion to be engaged with the weight at an inner peripheral surface of the cylindrical part of said final drive gear.

4. The electric actuator as defined in claim 1, further comprising an electric circuit including
    a controller having first switch means for changing the rotational direction of said motor, and a time constant circuit for setting conducting time of said first switch means,
    second switch means being opened when the conducting time has elapsed, and
    a command switch for outputting the operational command to the controller.

5. The electric actuator as defined in claim 4, wherein the first and second switch means are within the electric actuator.

* * * * *

UNITED STATES PATENT AND TRADEMARK OFFICE
CERTIFICATE OF CORRECTION

PATENT NO. : 5,086,900
DATED : February 11, 1992
INVENTOR(S) : Tomoyuki KIKUTA, et al.

It is certified that error appears in the above-identified patent and that said Letters Patent is hereby corrected as shown below:

On the title page, Item [63], Related U.S. Application Data, to read:

Continuation-in-part of Ser. No. 07/412,460, Sept. 26, 1989, Abandoned

Signed and Sealed this

Twenty-ninth Day of June, 1993

Attest:

MICHAEL K. KIRK

*Attesting Officer*    *Acting Commissioner of Patents and Trademarks*